US008340180B2

(12) United States Patent  
MacDonald et al.

(10) Patent No.: US 8,340,180 B2  
(45) Date of Patent: Dec. 25, 2012

(54) CAMERA COUPLED REFERENCE FRAME

(75) Inventors: Alan J. MacDonald, Malvern, PA (US); J. William Mauchly, Berwyn, PA (US); David W. Sowa, Exton, PA (US)

(73) Assignee: Cisco Technology, Inc., San Jose, CA (US)

( * ) Notice: Subject to any disclaimer, the term of this patent is extended or adjusted under 35 U.S.C. 154(b) by 694 days.

(21) Appl. No.: 12/407,907

(22) Filed: Mar. 20, 2009

(65) Prior Publication Data

US 2010/0239000 A1      Sep. 23, 2010

(51) Int. Cl.  
*H04N 11/04* (2006.01)

(52) U.S. Cl. .................................. 375/240.12

(58) Field of Classification Search .............. 348/14.08, 348/14.09; 375/240.01–240.29; 382/236  
See application file for complete search history.

(56) References Cited

U.S. PATENT DOCUMENTS

| | | | |
|---|---|---|---|
| 7,692,682 B2 * | 4/2010 | Pun et al. .................... | 348/14.08 |
| 2002/0092030 A1 * | 7/2002 | Gu ................................. | 725/134 |
| 2003/0206589 A1 * | 11/2003 | Jeon .......................... | 375/240.15 |
| 2005/0248652 A1 * | 11/2005 | Firestone et al. .......... | 348/14.09 |
| 2006/0098738 A1 * | 5/2006 | Cosman et al. ............ | 375/240.16 |
| 2006/0244819 A1 * | 11/2006 | Pun et al. .................... | 348/14.09 |
| 2007/0206673 A1 * | 9/2007 | Cipolli et al. .............. | 375/240.1 |
| 2008/0247463 A1 | 10/2008 | Buttimer et al. | |

FOREIGN PATENT DOCUMENTS

| | | |
|---|---|---|
| EP | 1635577 A2 | 3/2006 |
| JP | 5111021 A | 4/1993 |
| WO | 2005036491 A2 | 4/2005 |
| WO | 2009123997 A1 | 10/2009 |

OTHER PUBLICATIONS

Yu et al. "A Novel Error Recovery Scheme for H.264 Video and its Application in Conversatiional Services" Consumer Electronics, IEEE Transactions on, Feb. 2004, vol. 50, Issue 1, p. 329-334.*  
SM Shen et al., "Restricted Multiple Long Term Reference Frames", ITU Study Group 16-Video Coding Experts Group—ISO/IEC MPEG & ITU-T VCEG (ISO/IEC JTC1/SC29/WG11 and ITU-T SG16 Q6, Jan. 4, 2002.*  
Sm Shen et al., "Restricted Multiple Long Term Reference Frames", Itu Study Group 16-Video Coding Experts Group-Iso/Iec Mpeg & Itu-T Vceg (Iso/Iec JTC1/SC29/WG11 and Itu-T SG16 Q6, Jan. 4, 2002, pp. 1-2, figure 1.  
PCT Notification of Transmittal of the International Search Report and the Written Opinion, PCT/US2010/027092, 14 pages.

* cited by examiner

*Primary Examiner* — Thai Tran  
*Assistant Examiner* — Stephen Smith  
(74) *Attorney, Agent, or Firm* — Edell, Shapiro & Finnan, LLC

(57) ABSTRACT

Techniques are provided for managing long-term reference frames (LTRFs) for two or more video sources. A first video source is selected from a plurality of video sources. The first video source is encoded to produce an encoded video stream, where a reference frame message identifies a recent video frame as long-term reference frame (LTRF) associated with the first video stream. The process is repeated for other video streams. The LTRF associated with the first video stream is used as a reference for temporal predictive coding upon receiving a signal that the first video source has been re-selected.

20 Claims, 3 Drawing Sheets

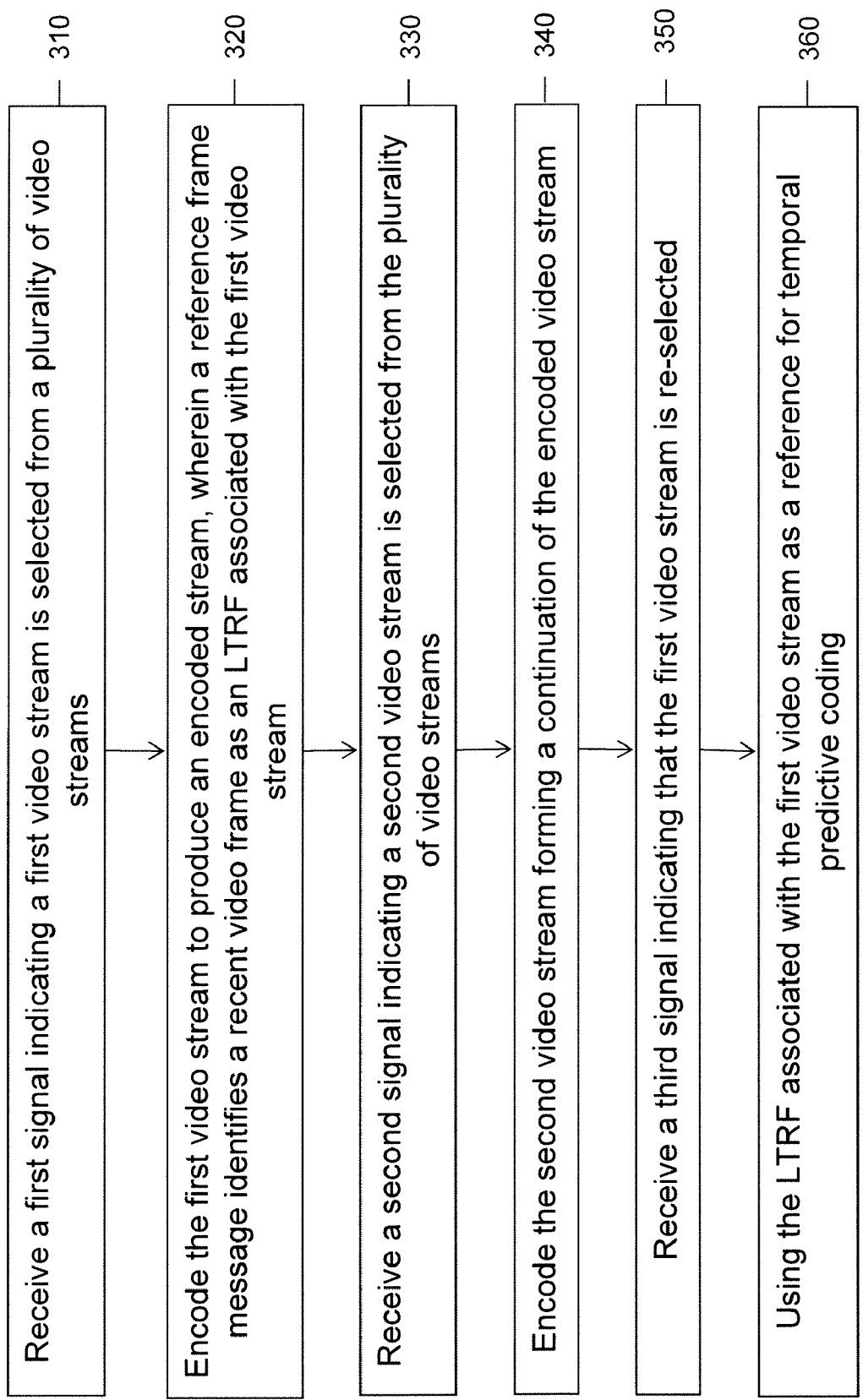

CAMERA COUPLED REFERENCE FRAME

TECHNICAL FIELD

The present disclosure relates to video encoding and particularly to techniques for managing long-term reference frames for a plurality of video streams.

BACKGROUND

The Motion Pictures Expert Group (MPEG) 4 advanced video coding (AVC) standard specifies the use of long-term reference frames (LTRFs). LTRFs are designed to have a greater persistence than traditional MPEG-2 I-frames and can be a designated B-frame, P-frame, or any other temporally predictive INTER frame requiring less bandwidth than an I-frame (or other fully independently coded frame). I-frames usually persist for the duration of a group of pictures (GOPs) and can also be used as a reference frame for error correction when errors occur over the transmission network. On the other hand, LTRFs can persist indefinitely and can also be used be used as a reference frame when errors occur over the network. The MPEG-4 standard defines a number of slots or placeholders in memory for LTRFs. LTRFs are generated by the encoder and identified in the encoded video stream. Both the encoder and decoder store the LTRFs.

When using LTRFs error feedback from the decoder is desired because any error in a frame (LTRF or not) will continue to propagate over time, i.e., future frames will continue to reference (or motion predict from) bad data in another decoded frame. The decoder can inform the encoder of errors such as a lost or damaged packet. An encoder receiving such feedback can correct the error, e.g., by encoding the next frame in such a way that it does not reference the erroneous data. One method to correct errors is to reference an LTRF that has been confirmed by the decoder not to contain errors and thereby avoid the need to send a higher bandwidth I-frame. In this case, the encoder needs to indicate to the decoder which LTRF is the reference frame for predictive coding. Error feedback also ensures that the LTRFs stored at the encoder and decoder are the same.

BRIEF DESCRIPTION OF THE DRAWINGS

The features and advantages of camera coupled LTRFs of the present disclosure will become apparent upon consideration of the following description of example embodiments thereof, particularly when taken in conjunction with the accompanying drawings wherein like reference numerals in the various figures are utilized to designate like components.

FIG. 3 illustrates an example of a flow chart of the LTRF management process in accordance with an embodiment of the present invention.

DESCRIPTION OF EXAMPLE EMBODIMENTS

Overview

Figure 1:
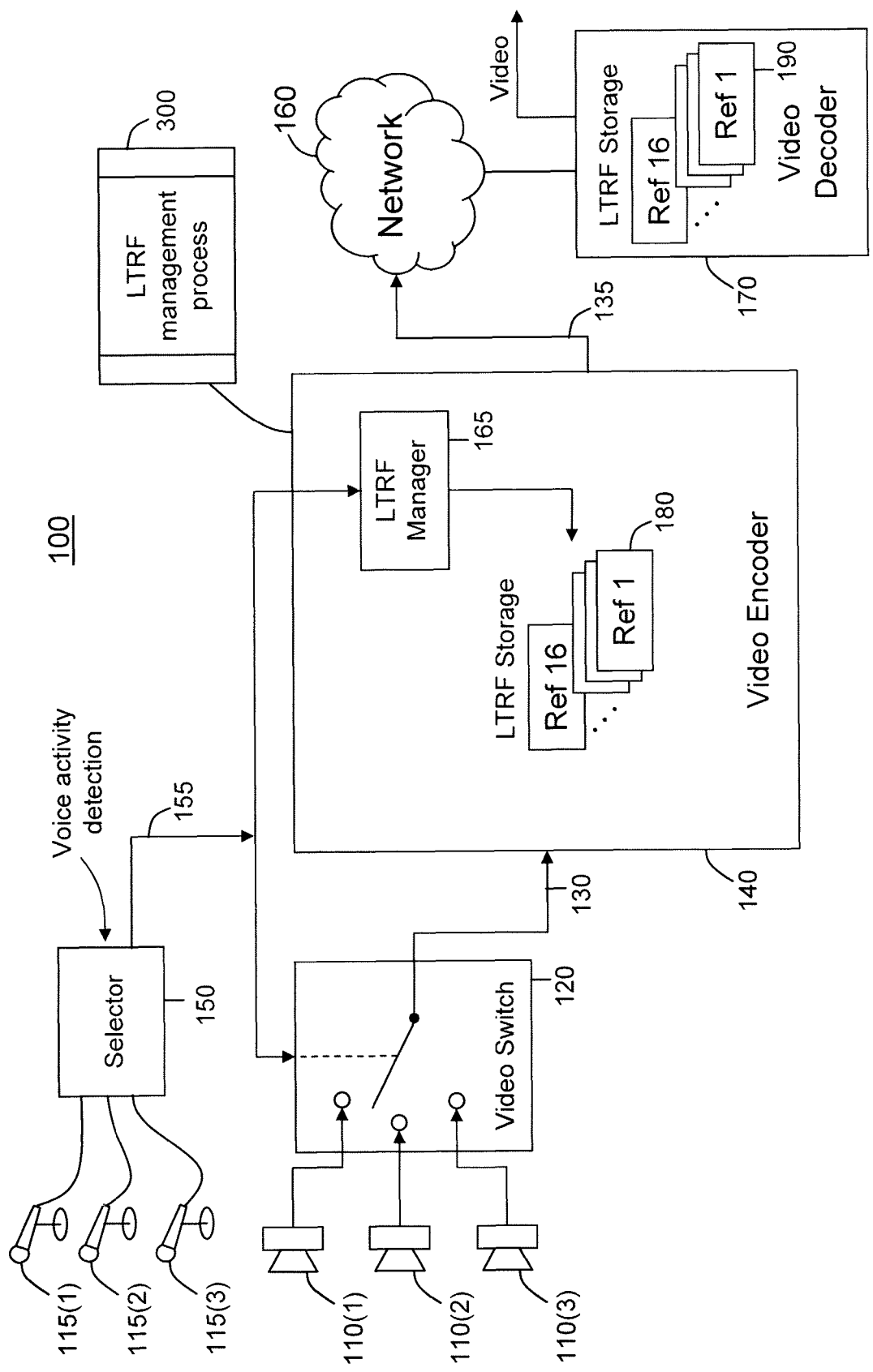
FIG. 1 illustrates an example of a block diagram of a system with an encoder employing a LTRF management process in accordance with an embodiment of the present invention.

Techniques are provided for managing LTRFs for two or more video streams. A first signal is received indicating a first video stream is selected from a plurality of video streams. The first video stream is encoded to produce an encoded video stream, where a reference frame message identifies a video frame as long-term reference frame (LTRF) associated with the first video stream. A second signal is received indicating a second video stream is selected from among the plurality of video streams. The second video stream is encoded and forms a continuation of the encoded video stream. A third signal is received indicating that the first video stream is re-selected, and on receipt of the third signal the LTRF is used as a reference for temporal predictive coding.

Techniques are also provided for a decoder to decode the encoded video stream and store the LTRFs identified in the reference frame message. If the reference frame message is not received or if the LTRF does not decode properly then the decoder can send feedback to the encoder. The encoder can use the feedback and knowledge of channel conditions to adjust the encoding scheme by using well-known error resilience or error concealment techniques. One well-known technique is Reference Picture Selection (RPS) described in Annex N of the International Telecommunications Union (ITU) H.263+ Recommendation. For a description of error resilience techniques with respect to long-term reference frames, see, Thomas Wiegand, Niko Färber, Klaus Stuhlmüller, and Bernd Girod: "Error-Resilient Video Transmission Using Long-Term Memory Motion-Compensated Prediction," IEEE Journal on Selected Areas in Communications, Vol. 18, No. 6, pp. 1050-1062, June 2000.

MPEG standards provide a high degree of compression by encoding blocks of pixels using various techniques and then using motion compensation to encode most video frames (or slices) as predictions from or between other frames. In particular, an encoded MPEG video stream is comprised of a series of GOPs (or group of blocks), and each GOP begins with an independently encoded I-frame (INTRA-coded frame) and may include one or more following INTER-coded frames, such as P-frames (predictive-coded frame) or B-frames (bi-directionally predictive-coded frame). Each I-frame can be decoded independently and without additional information. Decoding of a P-frame requires information from a preceding frame in the GOP. Decoding of a B-frame requires information from a preceding and a following frame in the GOP. Because B and P-Frames can be decoded using information from other frames they require less bandwidth when transmitted.

As video streams are switched, e.g., from one camera to another, the new picture may be drastically different from the previous picture and INTER-prediction may fail, and the encoder may resort to INTRA-prediction. This can cause a temporary interruption in the video quality at the destination each time the video stream is switched. INTRA-prediction results in lower picture quality compared to INTER-prediction for any given bandwidth (or bit-rate budget).

Embodiments disclosed herein are generally described with respect to an encoder and a decoder that conform to at least some parts of the ITU H.264 Recommendation (MPEG-4 Part 10). It should be understood that embodiments described herein, however, are not restricted to H.264, and can be used for any temporally coded compressed video that allows for the use of LTRFs or similar constructs. Embodiments are also generally described with respect to whole frames. It should be understood that the techniques described herein may be applied to partial frames such as a group of blocks or slices, i.e., spatially separated portions of a frame or picture.

In certain applications, such as cable television, many programs are available for decoding. The user may switch channels or the programming may switch to an advertisement. So, in general, the encoder must constantly update the LTRFs associated with the video stream as the scenes change. However, in certain other applications, such as teleconferencing or security systems, the background scenes do not change appreciably over time. Since the backgrounds do not change, the LTRFs for these applications can persist for a greater length of time or even indefinitely. Motion compensation for a teleconference will generally be limited to facial expressions and gestures. These other applications may also incorporate more than one video stream (e.g., a camera feed), selected one at a time, into a single an encoded video stream for transmission to another location. Embodiments described herein take advantage of the scene characteristics of these other applications to store LTRFs for a plurality of video streams even when the video stream is not being encoded.

Example Embodiments

Referring first to FIG. 1, a block diagram of a system configured to use a LTRF management process 300 is depicted generally at reference numeral 100. The system comprises a video switch 120, a video encoder 140, a network 160, and a video decoder 170. The video switch 120 is connected to three cameras 110(1)-110(3) and is configured to receive a selection signal 155 in order to select one camera and feed a raw video stream 130 to the video encoder 140 from the selected camera. Although three cameras are shown, any number of cameras or video stream may be used. The video switch 120 may also contain an interface (not shown) for communication with the video encoder 140 and vice versa.

The selection signal 155 is generated by a selector 150 configured to interface with sensors to detect sound (e.g., microphones 115), motion, a user input, or other detectable means such as, e.g., a change in background light intensity or a change in temperature, or combinations thereof (the remaining sensor types are not shown). In one example embodiment, the sensors for a teleconferencing application may be several microphones 115(1)-115(3) associated with the cameras 110(1)-110(3), respectively. For example, a person's voice may cause the selector 150 to select a camera feed associated with the person speaking.

In another example embodiment, the selector 150 may be coupled to motion detectors for a security system. When motion is detected the selector 150 selects a camera that covers the area associated with the motion detector. The video switch 120 then switches to the appropriate camera. If none of the motion detectors detect motion then the video switch 120 may periodically switch from camera to camera. The selector 150 may also detect a user input allowing the video switch 120 to select a camera feed desired by the user. Or in another embodiment the user input may override previously selected feeds that were selected based on sound and/or motion.

The relationships depicted in FIG. 1 between the cameras 110, the microphones 115, the video switch 120, the selector 150, and the video encoder 140 are simplified and not meant to be limiting, e.g., the video switch 120 may be separate or part of the video encoder 140 and the sensors may be individually coupled to a camera and the selector 150. In another example, the selector 150 may be part of the video encoder 140 in which case the video encoder 140 sends a signal to the video switch 120 indicating which video stream to select.

The selection signal 155 is also sent to an LTRF manager 165 in the video encoder 140 to inform the LTRF manager 165 which camera has been selected. Once selected, the raw video stream 130 is routed to the video encoder 140. The video encoder 140, along with LTRF manager 165, employs an LTRF management process 300 (hereinafter "the process") in accordance with an embodiment of the present invention. The video encoder 140 and the process 300 are described in more detail later in conjunction with FIGS. 2 and 3 respectively. The video encoder 140 encodes the raw video stream 130 to produce an encoded video stream 135. The encoded video stream 135 may be an MPEG-2 or MPEG-4 transport stream or the video encoder 140 may use any other protocol suitable for transporting audio, video, and data over a network. Both the video encoder 140 and the video decoder 170 have a LTRF storage 180/190 or other storage device (not shown) for storing both short term reference frames and LTRFs generated by the process 300, and the video encoder 140 and the video decoder 170 each have a network interface card (NIC, only shown for the encoder in FIG. 2) for communication over the network 160.

The network 160 may be an Internet Protocol (IP) network, an Asynchronous Transfer Mode (ATM) network, or any other network suitable for transmitting encapsulated audio, video, or other data. It should be understood that portions of the network 160 may include optical fibers, hybrid fiber coax, coax, cable modems, servers, intermediate networking components, and the like. The communication between the video encoder 140 and the video decoder 170 is bi-directional. In general, compressed audio and video are sent from the video encoder 140 to the video decoder 170 and feedback is sent from the video decoder 170 to the video encoder 140, although other types of communication are possible. For simplicity, FIG. 1 depicts a single communication path over the network 160. It is possible for multiple communications paths and or networks to be employed. For example, if it is anticipated that data requiring high bandwidth, like video data, will be transmitted in one direction and data requiring a lower bandwidth, like feedback, will be transmitted in the other direction then it may be more efficient to use two different networks, one for each direction.

Figure 2:
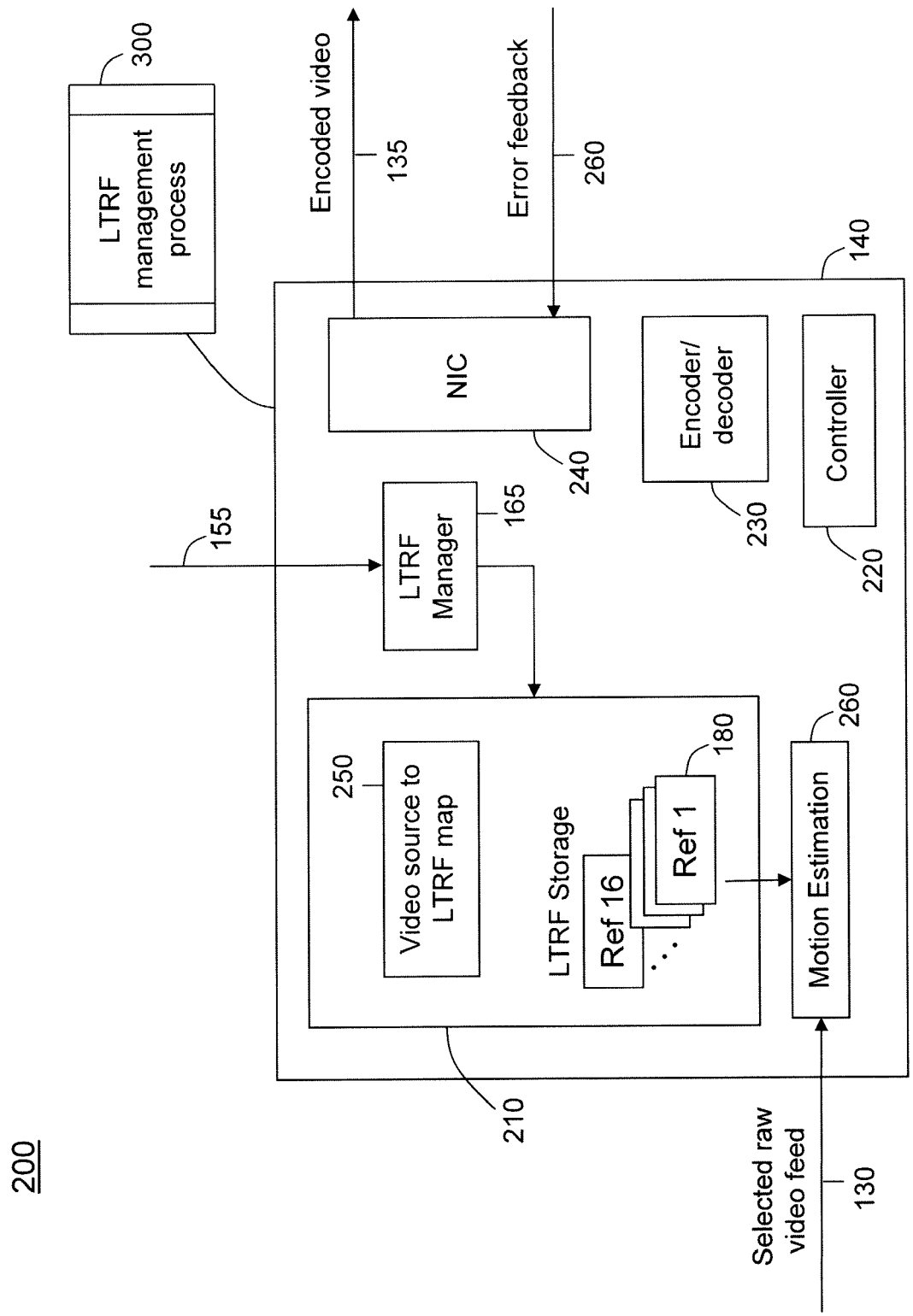
FIG. 2 illustrates an example of a block diagram of an encoder employing a LTRF management process in accordance with an embodiment of the present invention.

Turning now to FIG. 2, the video encoder 140 from FIG. 1 is shown in greater detail. The video encoder 140 contains a memory 210, a controller 220, an encoder decoder (ECD) 230, a network interface card (NIC) 240, and a motion estimation block 260. The functions of the controller 220 may be implemented by logic encoded in one or more tangible media (e.g., embedded logic such as an application specific integrated circuit (ASIC), digital signal processor (DSP) instructions, software that is executed by a processor, etc.). In addition to storing reference frames 180, the memory 210 stores data used for the methods described herein, e.g., metadata for a video source to LTRF map 250 and/or software or processor instructions that are executed to carry out the methods described herein. The memory may separate or part of the controller 220 or a combination thereof. Thus, the process 300 may be implemented with fixed logic or programmable logic (e.g., software/computer instructions executed by a processor) and the controller 220 may be a programmable processor, programmable digital logic (e.g., field programmable gate array (FPGA)) or an ASIC that comprises fixed digital logic, or a combination thereof.

The ECD 230 is configured to encode video and audio to form an outgoing encoded video stream 135 for transmission via the NIC 240. The NIC 240 may also be configured to receive an encoded video stream and the ECD 230 may then decode the incoming encoded video stream (not shown) such as might be the case if a video conference were being conducted. Thus, the video encoder 140 and the video decoder 170 may be identical pieces of hardware and more than one encoder may be employed at any one location. It will be appreciated by those skilled in the art the ECD 230 may be an on-chip hardware accelerator in the case the controller 220 is a specialized video DSP like the Texas Instruments TMS320DM64x series, or the ECD 230 may be an off-chip device such as an FPGA.

Referring now to FIG. 3, with continued reference to FIG. 2, a process 300 for managing LTRFs is described. At 310, a first signal is received indicating a first video stream is selected from a plurality of video streams (e.g., raw video stream 130). The video stream is selected using the aforementioned or other techniques. The selection signal 155 is also sent to an LTRF manager 165 in the video encoder 140 to inform the LTRF manager 165 which video stream has been selected. The LTRF manager 165 maps the source selection signal into an LTRF selection signal.

At 320, the first video stream is encoded to produce an encoded video stream (e.g., encoded video stream 135). Within that stream, the encoder identifies a particular frame to become a LTRF. The encoder stores this frame locally, designates it as an LTRF, and signals this designation within the stream using a reference frame message.

At 330, a second signal is received indicating a second video stream is selected. The selection signal 155 is sent to an LTRF manager 165 in the video encoder 140 to inform the LTRF manager 165 which video stream has been selected. Again the encoder identifies a particular frame to become a LTRF. The encoder stores this frame locally, designates it as an LTRF, and signals this designation within the stream using a reference frame message. However, in accordance with an embodiment, the new LTRF does not replace the first LTRF in memory. The new LTRF is held in a separate "slot".

In one example embodiment the LTRF storage 180 has a fixed number of slots to store LTRFs. The number of slots depends on the coding standard, system design, and other considerations like the number of video feeds the video encoder 140 may have to select from. In the following example the encoder has 16 slots to store LTRFs. Accordingly, the decoder's 170 LTRF storage 190 (FIG. 1) would also be designed with 16 slots. The 16 LTRF slots may be divided among the number of video streams evenly or according to other system requirements like the amount of motion compensation that must be performed for one stream versus another. If, e.g., the encoder has three video streams to select from (e.g., from cameras 110(1)-110(3)), then each stream will get five slots for a total of 15 with one spare slot, or two streams could be allocated four slots with the remaining stream getting eight slots. In another example, if the encoder has four video streams to select from then each video stream could be allocated four LTRF slots.

The LTRFs are each stored with some corresponding metadata in the video source to LTRF map 250. The video source to LTRF map 250 and the LTRF storage 180 are managed by the LTRF manager 165. For example, the metadata could comprise a video stream identification (video_stream_ID), a long term picture number (long_term_pic_num), and an LTRF status, each assigned by, e.g., the LTRF manager 165 and stored in the video source to LTRF map 250. It is this metadata that forms the association between a video stream and the LTRFs. Thus, when encoding another selected video stream, the video encoder 140 can immediately use an LTRF that is already stored and associated with the newly selected video stream without resorting to INTRA-prediction. Table 1 indicates one possible data structure for metadata stored in the video source to LTRF map 250 and LTRF storage 180:

TABLE 1

Example data structure for LTRF storage

Metadata in the video source to LTRF map 250

| video_stream_ID | long_term_pic_num | LTRF Status | LTRF storage 180 |
| --- | --- | --- | --- |
| 2 | 1 | ACKed | LTRF data |
| 2 | 2 | ACKed | LTRF data |
| 2 | 3 | ACKed | LTRF data |
| 2 | 4 | ACKed | LTRF data |
| 2 | 5 | ACKed | LTRF data |
| 1 | 6 | ACKed | LTRF data |
| 1 | 7 | ACKed | LTRF data |
| 1 | 8 | ACKed | LTRF data |
| 1 | 9 | NACKed | LTRF data |
| 1 | 10 | created | LTRF data |
| 3 | 11 | ACKed | LTRF data |
| 3 | 12 | ACKed | LTRF data |
| 3 | 13 | ACKed | LTRF data |
| 3 | 14 | ACKed | LTRF data |
| 3 | 15 | empty | empty |
| none | none | empty | Spare |

The data in Table 1 represents the example given earlier in which the encoder has three video streams to select from and each stream is assigned 5 LTRF slots in memory. The data structure in Table 1 indicates that at one time or another each video stream was selected long enough for a set of LTRF data to be generated for the corresponding video stream. The data structure indicates that video stream 2 may have been the first video stream selected (e.g., from camera 110(2)), followed by video stream 1 (camera 110(1)), however no particular significance is given to the order or values in Table 1 other than the long_term_pic_num must be unique for any given LTRF data.

The LTRF manager 165 controls the association of video source (video_stream_ID) to LTRF data, and also maintains the LTRF status of each LTRF slot. An LTRF slot may be empty, it may be created (but not acknowledged) or it may be ACKed or NACKed by the decoder as described below.

If, for example, the video encoder 140 is currently encoding video stream number 2, then as can be seen from the long_term_pic_num, LTRF status, and LTRF storage columns in Table 1 that the video encoder 140 has LTRFs 1-5 to choose from for temporal prediction because each LTRF has data available and each LTRF has been ACKed by the decoder as a good LTRF. If the video stream is switched to, e.g., video stream number 1, then the video encoder 140 immediately has LTRFs 6-8 to choose from for temporal prediction (with LTRF 9 being NACKed by the decoder and LTRF 10 yet to be ACKed/NACKed). The video encoder 140 also has the option of identifying a new LTRF and replacing one of the 5 allocated LTRFs with the new LTRF in the LTRF storage 180. Table 1 would be updated accordingly.

As new LTRFs are identified and stored the long_term_pic_nums will change or increment. The long_term_pic_nums are sent in the reference frame message by the video encoder 140 to identify to the decoder which LTRF data to reference during the decoding process. The data in Table 1 are replicated at the decoder with the exception of the video_stream_ID which is not needed by the decoder. Thus the decoder "sees" normally encoded video and the process 300 is transparent to the decoder.

Referring again to FIG. 3, at 340, the second video stream is encoded forming a continuation of the encoded video stream. At 350, a third signal is received indicating that the first video stream has been re-selected. The third signal informs the encoder 140 that the first video source has been re-selected and the encoder 140 takes a special action. In the case where an LTRF associated with that source has been ACKed, the encoder 140 tries to use that LTRF. At 360, the encoder 140 uses that LTRF as a reference frame for temporal predictive coding. The new frame, to be encoded, is compared to the associated LTRF in the motion estimation block 260. Since the new picture is essentially the same scene as the LTRF, the predictive coding will be successful and the new picture can be encoded very efficiently, achieving high quality without a large expenditure of bits. This is the benefit of this technique. The benefit is most noticeable when the bitrate is constrained per frame, as it usually is in telecommunications systems.

The method may be repeated for any other video stream selected from among the plurality of video streams and encoded by the same encoder that encoded the first video stream. If any video stream already has a stored LTRF associated therewith, then the stored LTRF is used for temporal predictive coding.

In another example embodiment, the video encoder 140 receives error feedback 260 (FIG. 2) from the decoder indicating whether or not the LTRF was correctly decoded and that the reference frame message was correctly received. If either the LTRF was incorrectly decoded or the reference frame message was incorrectly received then the reference frame message is resent until the error feedback indicates that the reference frame message was correctly received and an identified LTRF was correctly decoded. It should be understood that any new reference frame message used to correct any transmission/decoding error may reference an entirely new LTRF and that the encoder is not required to correct any previously sent LTRF that was received by the decoder with errors.

For error feedback, the decoder can send a positive acknowledgement (ACK) indicating that the LTRF was correctly decoded or a negative acknowledgment (NACK) indicating that the LTRF was incorrectly decoded (or that any associated packets were damaged in transit). The encoder and decoder can be designed to use only ACKs, in which case only correctly decoded frames are acknowledged and any LTRFs not ACK'd are considered to contain errors. Alternately, encoder and decoder can be designed to use only NACKs in which case only incorrectly decoded frames are acknowledged and any LTRFs not NACK'd are considered to be error free. In a preferred embodiment both ACKs and NACKs are employed. It should be understood that the decoder does not have to wait for an entire frame to be decoded before sending ACKs/NACKs, thus reducing latency in error correction and mitigating any latency in the transmission network (like network 160 shown in FIG. 1). The frame can by subdivided into slices (or a group of blocks), in which case the ACKs/NACKs can be sent by the decoder for each slice.

Techniques are provided for managing long-term reference frames (LTRFs) for two or more video streams. Embodiments describe herein take advantage of the fact that background scenes do not change appreciably over time for certain applications such as teleconferencing. Thus, LTRFs can be stored for a plurality of video streams even when the video stream is not being encoded and thereby avoid the use of independently coded frames.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
receiving a first signal from a signal source selection device coupled to a plurality of audio sources each associated with a corresponding video source of a plurality of video streams indicating a first video stream is selected from the plurality of video streams;
encoding the first video stream to produce an encoded video stream, wherein a reference frame message identifies a video frame as a long-term reference frame (LTRF) and the LTRF is associated with the first video stream;
receiving a second signal from the signal source selection device indicating a second video stream is selected from the plurality of video streams;
encoding the second video stream forming a continuation of the encoded video stream; and
receiving a third signal from the signal source selection device indicating that the first video stream is re-selected, and on receipt of the third signal,
using the LTRF associated with the first video stream as a reference for temporal predictive coding.

2. The method of claim 1, wherein selecting comprises selecting based on predetermined criteria comprising detecting sound, detecting motion, and/or detecting a user input.

3. The method of claim 1, wherein encoding comprises encoding using a coding standard comprising one of International Telecommunications Union (ITU) H.263, Motion Pictures Expert Group (MPEG)-4 AVC, Audio Video Standard (AVS), and VC1.

4. The method of claim 1, wherein encoding further comprises identifying additional LTRFs in the reference frame message associated with the first or second video stream.

5. The method of claim 1, wherein the LTRF is a Motion Pictures Expert Group (MPEG) 4 AVC LTRF.

6. The method of claim 1, wherein encoding further comprises periodically updating an LTRF associated with the first or second video stream with a new LTRF by way of a reference frame message.

7. The method of claim 1, further comprising receiving error feedback from a decoder indicating whether or not the LTRF identified in the reference frame message was correctly decoded and that the reference frame message was correctly received at the decoder, wherein if either the LTRF was incorrectly decoded or the reference frame message was incorrectly received then resending the reference frame message until the error feedback indicates that the reference frame message was correctly received and the identified LTRF was correctly decoded.

8. An apparatus comprising:
a video source selection signal pathway coupled to a plurality of audio sources each associated with a corresponding video source of a plurality of video streams;
a switch configured to select a video source from the plurality of video sources according to the video source selection signal;
an encoder configured to encode the selected video source to produce an encoded video stream, wherein messages within the encoded video stream identify certain video frames as long-term reference frames (LTRF); and
logic configured to select a particular LTRF for reference in temporal predictive coding according the video source selection signal.

9. The apparatus of claim 8, wherein the switch is configured to select a video stream based on predetermined criteria comprising detecting sound, detecting motion, and/or detecting a user input.

10. The apparatus of claim 8, wherein the encoder is configured to encode using a coding standard comprising one of ITU H.263, a Motion Pictures Expert Group (MPEG)-4 AVC, AVS, and VC1.

11. The apparatus of claim 8, wherein the encoder is further configured to identify additional LTRFs associated with the selected video source in the messages.

12. The apparatus of claim 8, wherein the encoder is configured to identify LTRFs comprising a Motion Pictures Expert Group (MPEG)-4 AVC LTRFs.

13. The apparatus of claim 8, wherein the encoder is configured to periodically update LTRFs associated with the selected video source with new LTRFs, and wherein the new LTRFs are identified in the messages.

14. The apparatus of claim 8, wherein the encoder is further configured to receive error feedback from a decoder indicating whether or not the LTRF identified in the reference frame message was correctly decoded and that the reference frame message was correctly received at the decoder, wherein if either the reference frame message was incorrectly received or the LTRF was incorrectly decoded then resending the reference frame message until the error feedback indicates that the reference frame message was correctly received and the identified LTRF was correctly decoded.

15. Logic encoded in one or more non-transitory media for execution and when executed operable to:
   select a first video source from a plurality of video sources based on a source selection signal from a signal source selection device coupled to a plurality of audio sources each associated with a corresponding video source of a plurality of video streams;
   encode the first video source to produce an encoded video stream, wherein a reference frame message identifies a recent video frame as an LTRF associated with the first video source;
   select a second video source from the plurality of video sources based on the source selection signal;
   encode the second video source into the same encoded video stream;
   in response to the video source selection signal, reselect the first video stream, and
   encode the first frame of the re-selected first video source with a temporally predicted picture which refers to the LTRF associated with the first video source.

16. The logic of claim 15, wherein the logic that selects the first or second video source is operable to select based on predetermined criteria comprising detecting sound, detecting motion, and/or detecting a user input.

17. The logic of claim 15, wherein the logic that encodes is operable to use a coding standard comprising one of ITU H.263, a Motion Pictures Expert Group (MPEG)-4 AVC, Audio Video Standard (AVS), and VC1.

18. The logic of claim 15, wherein the logic that encodes is further operable to identify additional LTRFs in the reference frame message.

19. The logic of claim 15, wherein the logic that encodes is further operable to update an LTRF associated with the first or second video source from time to time with a new LTRF by way of a reference frame message.

20. The logic of claim 15, further comprising logic to receive error feedback from a decoder indicating whether or not the LTRF was correctly decoded, wherein if the LTRF was incorrectly decoded then sending additional LTRFs until an LTRF is correctly decoded.

* * * * *